May 5, 1931.   G. R. NAPIER   1,803,402
WOODWORKING MACHINE
Filed Sept. 11, 1926
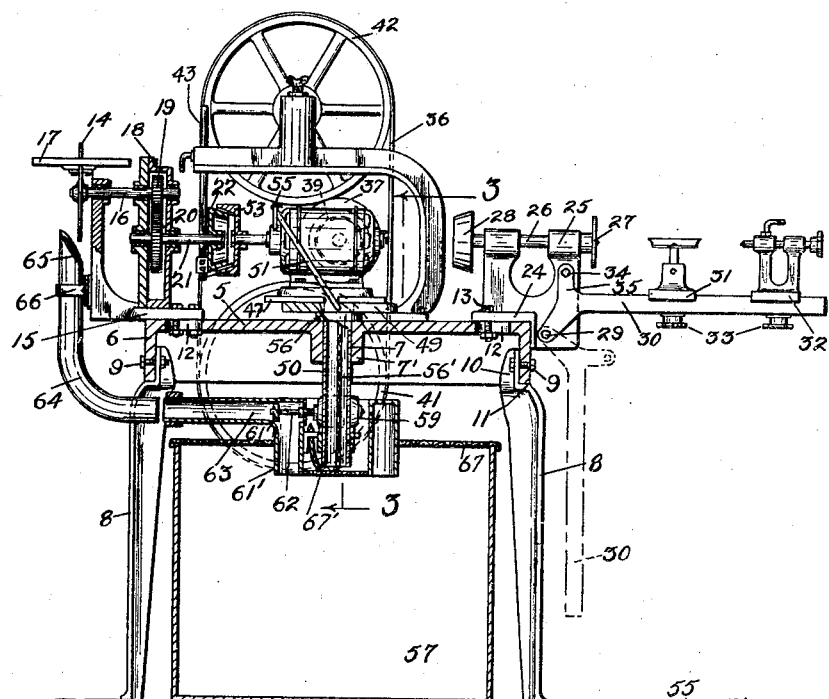
INVENTOR
George R. Napier
BY Richey & Watts
his ATTORNEYS Patented May 5, 1931

1,803,402

UNITED STATES PATENT OFFICE

GEORGE R. NAPIER, OF CLEVELAND, OHIO

WOODWORKING MACHINE

Application filed September 11, 1926. Serial No. 134,864.

My invention is an improvement in machines of the universal type wherein a power unit may be utilized through suitable mechanism to selectively operate any one of a number of devices or tools.

An object of my invention is to selectively drive or operate from a centralized power unit any one of a number of driven units arranged thereabout.

Another object of my invention is to selectively operate through suitable mechanism any one of a number of suitable devices or tools, such, for instance, as a band saw, a lathe, a circular saw or other devices arranged about a centralized power unit.

Another object of my invention is to conduct dust, chips or other matter, which is being released during the operation of any one of the several devices or tools, to a suitable receptacle and to prevent contamination of the surrounding atmosphere with dust particles released during the operation of the apparatus.

A still further object of my invention is to lock any one of the tools in power coupled relation with the power unit.

A further object of my invention is to economically construct an apparatus of the above named character which is simple of construction and operation and which is capable of universal use in the shop as well as in the home.

Other objects and advantages of my invention will become apparent from the following description and the accompanying drawings which form a part of this specification and in which like reference characters are employed to designate like parts throughout the same.

Fig. 1 is a side elevation partly in section of a machine constructed in accordance with my invention.

Fig. 2 is a top plan view of the tool supporting table showing the power unit in position to be connected in driving relation to one of the devices or tools and showing how the various devices may be adjusted upon the table; and Fig. 3 is an enlarged view partly in section showing the power unit and support assembly. In carrying out my invention I provide means for supporting a plurality of driven units which may include, as shown in the drawings, a table or tool support 5 having a preferably flat upper supporting surface and a downwardly extending annular flange 6 and an axial opening 7. A boss 7' opening depends from the support about the opening 7. Legs 8 are provided with upwardly extending flanges offset inwardly, which are adapted to be secured to the inner annular wall of the flange 6 of the support by suitable bolts and nuts 9. It is to be noted that the upper extremities of the respective legs 8 are so formed that the flanges 10 form with the upper leg structure, a seat 11 for seating the bottom wall of the flange 6. The upper or supporting surface of the support 5 is provided with a series of radially extending longitudinal slots 12 spaced in an annular path adjacent the periphery of the support 5. These radially extending slots are provided for the purpose of permitting various driven units or tools to be secured upon the support by means of bolts 13.

In the drawings I have shown a multiplicity of driven units or tools having their driven power shafts arranged preferably radially about the support 5. These units are secured to the support in such a manner that they may be operatively coupled in power transmitting relation to the centralized driving unit or power plant. These driven units or tools, as shown in the drawing, may include a circular saw 14 having a supporting base 15 upon which is rotatably mounted the shaft 16. The circular saw 14 is mounted upon one end of the shaft and operates in a slot provided in a work table 17. The other end of the shaft is rotatably supported in a housing 18 and carries a pinion 19 thereon. The pinion 19 meshes with a pinion 20 which is keyed to one end of the driven shaft 21. A male clutch member 22 which may be of the cone type is keyed to the other end of the driven shaft 21 as shown in Figs. 1 and 2.

Another driven unit or tool may consist of a lathe 22 having a base 24 which is secured upon the table by means of bolts 13. This lathe may consist of a head stock 25 upon which is rotatably supported a driven shaft 26 carrying at one end a work holder or clutch 27 and at the other end a male clutch member 28. Pivotally secured to the head stock 25 at 29 is a bed 30, a tool rest 31 and a tail stock 32 which are adjustably carried by the bed 30, and each of the members 31 and 32 may be secured in the desired adjusted position along the bed 30 by means of the respective nuts 33. When it is desired to support the bed 30 as shown in solid lines in Fig. 1, a pin 34 is passed through an opening in an arm 35 of the bed member and thence into an opening in the head stock 25 so that the bed 30 may be rigidly supported in the position shown. If, however, it is desired to drop the bed 30 to the side to accommodate work of enlarged dimensions, as shown in dotted lines, the pin 34 may be removed, whereupon the bed member may be swung downwardly about its pivot 29.

Another driven unit or tool may consist of a band saw 36. The band saw is driven by means of a friction pulley 37 secured on one end of a rotatable shaft 38. The other end of the shaft 38 is provided with a male clutch member 39. The friction pulley 37 is in peripheral, frictional engagement with the periphery of the guide wheel 42 and drives the same when power is applied to the shaft 38 through the clutch member 39. The band saw passes over the guide wheel 42 and thence downwardly through the guide 43 and about the wheel 41, and thence back over the wheel 42.

Although I have described but several driven units or tools which may be used in connection with this invention, it is to be understood that I may employ various other driven units, tools or devices including apparatus for metal-working, wood-working, household and other uses. I may also secure instruments for performing extremely delicate operations, such, for instance, as those used by jewelers including lathes, buffers, guiders, etc., to a support in the manner described above whereby a centralized power unit may be coupled in power transmitting relation to any of the instruments for operating the same. In this connection, it is to be understood that I may also arrange the various driven units upon a rotatable support whereby the support and units may be rotated in either direction about a fixed centralized power unit.

I provide a power unit which consists preferably of an electric motor 45, although it is to be understood that any other suitable power unit may be used. The motor may be fixed upon a plate 42 by means of bolts, the plate having a depressed portion 46 and outwardly extending edges 47'. Notches 48 are formed on the opposite edges as shown in Figs. 2 and 3. The depressed portion of the plate is slidably seated within a dished platform 49, the platform being mounted upon the upper end of a tubular support 50 to rotate therewith. A bail 51 having its ends bent inwardly and seated in depressions 52 on opposite sides of the platform 49 extends upwardly above the motor to form a handle, the handle being capable of being rocked back and forth axially of the motor. It will be noted that the arms of the bail or motor shifting handle extend through the respective notches 48 in the plate 46 to engage the walls of the notches and movement of the handle in either direction will cause the motor and its supporting plate 47 to be shifted in the corresponding direction to bring it into and out of driving connection with one of the driven devices.

A female clutch member 53 is keyed to the free end of the motor shaft 54. This clutch member may be lined with suitable fabricated or other material to effect a more positive coupling between the clutch members, although the lining may be eliminated if desired. I have provided a latch 55 which may be secured to the motor frame, and which has its free end bent to form a hook whereby the looped portion of the handle 51 may be grasped and held against accidental displacement after the motor has been shifted so that the female clutch member 53 is coupled in power transmitting relation with one of the various male clutch members 22.

The platform 49 secured to rotate with the tubular support 50 may be spaced from the support 5 by a spacer 56, although this spacer may be eliminated if desired. As electrical conductor 56' passes upwardly through the tube 50 and is connected to supply current to run the motor 45. The tubular member extends downwardly through the opening 7 and projects into a receptacle 57 as shown in Fig. 1. Secured to the tubular support 50 is a suction device comprising a motor 59 supported upon a support 60 adjustably clamped to the tube 50 as shown in Fig. 3. A suction fan element 61 is secured to the motor shaft 62 which extends into the conduit 63. One end of the conduit terminates in an annular exhaust device 61' which extends downwardly and into the receptacle 57. This device 61' together with the conduit may be secured to the adjustable support 60, so that the entire conduit and suction device may be removed from the tube 50 as a unit, if desired. The other end or mouth of the conduit extends radially from the tubular member 50 and is adapted to communicate with the outlet ends of the various conduits 64 so that when the clutch member 53 is coupled to one of the clutch members 28 for operating one of the driven units, the conduit 63 will be in communicating position with the respective conduit 64. It will be noted from Fig. 1, which shows the parts in the position just described, that dust, chips and other material will be drawn into the mouth 65 of the conduit 64 which is supported at 66 and thence through the conduit 63 and deposited in the receptacle 57 through the outlet device 61'. Each of the driven units supported upon the support may carry a conduit 64 having its mouth so arranged that when the blower is in operation the material liberated by the particular driven unit may be conducted through the conduits and deposited into the receptacle, although I may eliminate one or more of the conduits 64 if I so desire.

The receptacle 57 is provided with a screened cover 67 having a central opening to permit the discharge device 61' to extend therethrough and rotate with the tube 50. This screen is provided to prevent the escape of the foreign matter from the receptacle which is kept in a state of slight agitation while the blower is in operation. A screen 67' may be secured to the discharge device 61' as shown in Fig. 1 to more effectively provide against the escape of the material from within the receptacle when the suction device is in operation.

The operation of the apparatus is as follows:

When it is desired to use one of the driven units, for example, the circular saw 14, the operator grasps the handle 51 and rotates the motor upon the table, which causes the tubular support 50, suction device, and conduit 63 assembly to rotate, until the clutch member 53 is in approximate axial alignment with the clutch member 22 on the shaft 26. The handle 51 may now be swung to the left as in Fig. 1 whereupon its lower ends which pass through the notches 48 in the plate 47 will engage the forward walls of the notches and cause the plate and motor to slide forwardly engaging the clutch members 22 and 53. The handle may now be locked into this forward position by forcing its upper portion under the hooked end of the latch 55. The motor may be started before or after the coupling is made between the motor and the selected driven unit by closing a switch (not shown) in the electrical circuit between the motor and current source. Hence the shaft 16 which carries the saw 14 will be driven under power from the motor through the pinions 19 and 20 and shaft 21. It will be noted that the conduits 63 and 64 are also in alignment when the clutch members are coupled so that dirt, dust or chips may be conveyed into the receptacle as already described. The clutch members may be disengaged simply by releasing the handle 51 from the latch and again lifting it to a substantially vertical position as shown in Fig. 2, whereupon the power plant may be rotated upon the table for coupling to any one of the other driven units.

The operation of the various other tools supported upon the support 5 is accomplished in a manner similar to that described above.

It is noted that the suction motor 59 may be connected electrically to the conductor 56' to be operated simultaneously with the motor 45, but it is to be understood that I may place an independent switch (not shown) in the circuit between the suction motor and the circuit leading to the motor 45 for operating the suction device independently of the motor 45.

While I have herein described and shown such tools as band saws, circular saws and lathes, it is to be understood that various other driven units may be operated by the mechanism herein disclosed, such as for instance, household tools and implements, and wood and metal working tools and the like. It is also to be understood that apparatus constructed in accordance with my invention may be used for heavy work or may be used for extremely light and delicate work, such as used by jewelers, including lathes, buffers, drills, etc.

Various changes may be made in the construction and operation of my invention without departing from the spirit of the invention or the scope of the appended claims.

I claim:

1. In combination, a support, a power plant rotatably mounted thereon, a multiplicity of tools detachably carried by the support, and adapted to be selectively driven by the power plant, said power plant being capable of circumferential and radial movement with respect to the support.

2. In combination, a support, a power plant rotatably mounted thereon, a multiplicity of tools detachably carried by the support, and adapted to be selectively driven by the power plant, said power plant being capable of circumferential and radial movement with respect to the support, a clutch member on each of said tools, a co-operating clutch member on said power plant, and means for moving said power plant radially of the support whereby said co-operating clutch member may be coupled to one of the first named clutch members for driving the respective tool.

3. In combination, a support, a power plant rotatably mounted thereon, a multiplicity of tools detachably carried by the support, and adapted to be selectively driven by the power plant, said power plant being capable of circumferential and radial movement with respect to the support, a clutch member on each of said tools, a co-operating clutch member on said power plant, and means for moving said power plant radially of the support whereby said co-operating clutch member may be coupled to one of the first named clutch members for driving the respective tool, and means for maintaining the power coupled relation between the respective clutch members.

4. In combination, a support, a multiplicity of driven units detachably carried by the support, a power plant, said driven units being selectively driven by the power plant, a conduit associated with each of said units, the respective mouths of said conduits being disposed to receive material released by the respective units during their operation, and a conduit movable with the power plant and cooperating with the conduit associated with the selected driven unit, when the power plant is operatively connected with the said selected driven unit, said movable conduit being capable of conveying dust and chips from the driven unit to a receptacle.

5. In combination, a support, a multiplicity of driven units detachably carried by the support, a power plant, said driven units being selectively driven by the power plant, a conduit associated with each of said units, the respective mouths of said conduits being disposed to receive material released by the respective units during their operation, and a conduit movable with the power plant and cooperating with the conduit associated with the selected driven unit, when the power plant is operatively connected with the said selected driven unit, said movable conduit being capable of conveying dust and chips from the driven unit to a receptacle and means operable simultaneously with said power plant for forcibly conducting dust or chips from the selected driven unit to a receptacle.

6. In combination, a support, a multiplicity of driven units detachably carried by the support, a power plant, said driven units being selectively driven by the power plant, a conduit associated with each of said units, the respective mouths of said conduits being disposed to receive material released by the respective units during their operation, and a conduit movable with the power plant and cooperating with the conduit associated with the selected driven unit, when the power plant is operatively connected with the said selected driven unit, said movable conduit being capable of conveying dust and chips from the driven unit to a receptacle, a receptacle for receiving said material and means for preventing the escape of said material from the receptacle.

7. In combination, a driving motor having its driving shaft disposed in a horizontal plane, a plurality of driven units circumambient said motor and having their power shafts arranged in a plane common to the plane of the motor driving shaft, means for selectively coupling said driving motor to said driven units, and means for locking said driving motor in power coupled relation with the selected driven unit.

8. In combination, a motor, a plurality of driven units circumambient said motor, each of said driven units having a horizontally disposed power shaft, a clutch member associated with each driven unit power shaft, and a cooperating clutch member on the motor disposed in power transmitting relation to any of the said driven units.

9. In combination, a motor, a plurality of driven units arranged about said motor and having their power shafts disposed in a common horizontal plane, a clutch member associated with each driven power shaft, a cooperating clutch member on the said motor, means for adjusting said motor in co-axial alignment with the said driven units and means for maintaining relative locked engagement of the motor clutch member and the driven clutch member.

10. In combination, a support, a motor rotatably mounted thereon and having its shaft in a horizontal plane, a plurality of driven units detachably carried by said support, each of said units having a power shaft disposed in a plane common to the plane of said motor shaft, a clutch member mounted upon each of said driven units, a clutch member mounted upon said motor, means for radially and circumferentially adjusting said motor clutch into coaxial alignment with any of the said driven unit clutches.

11. In combination, a support having a series of radial elongated slots therein adjacent the periphery thereof, a plurality of driven units detachably carried by said support and mounted in certain of said elongated slots, a motor mounted upon said support and rotatably adjustable thereon, clutch members associated with said driven units, a clutch member upon said motor, means for adjusting said motor in co-axial alignment with said driven units and means for adjusting said motor in power coupled relation with said driven units.

12. In combination, a support, a plurality of tools detachably secured to the support, a motor adapted to be selectively and directly coupled in power transmitting relation to any one of said tools, a support for said motor, said support being mounted for radial translation with said first named support.

13. In combination, a support, a motor rotatably mounted thereon and having its shaft in a horizontal plane, a plurality of driven units detachably carried by said support, each of said units having a power shaft disposed in a plane common to the plane of said motor shaft, a clutch member mounted upon each of said driven units, a clutch member mounted upon said motor, means for radially and circumferentially adjusting said motor clutch into coaxial alignment with any of the said driven unit clutches, and means for locking said motor in said power coupled relation.

14. In combination, a support, a plurality of driven units having power shafts and mounted upon said support in such a manner that said power shafts are disposed substantially radially with respect to a common center located within said support, a motor mounted upon said support for rotation relative thereto about an axis passing through said center, and means for selectively coupling said motor with said driven units.

In testimony whereof I hereunto affix my signature this 8th day of September, 1926.

GEORGE R. NAPIER.